W. T. MURRAY.
SPRING WHEEL.
APPLICATION FILED JUNE 6, 1911.

1,018,259.

Patented Feb. 20, 1912.

3 SHEETS—SHEET 1.

Witnesses

Inventor
William T. Murray
By H. L. Woodward
Attorney

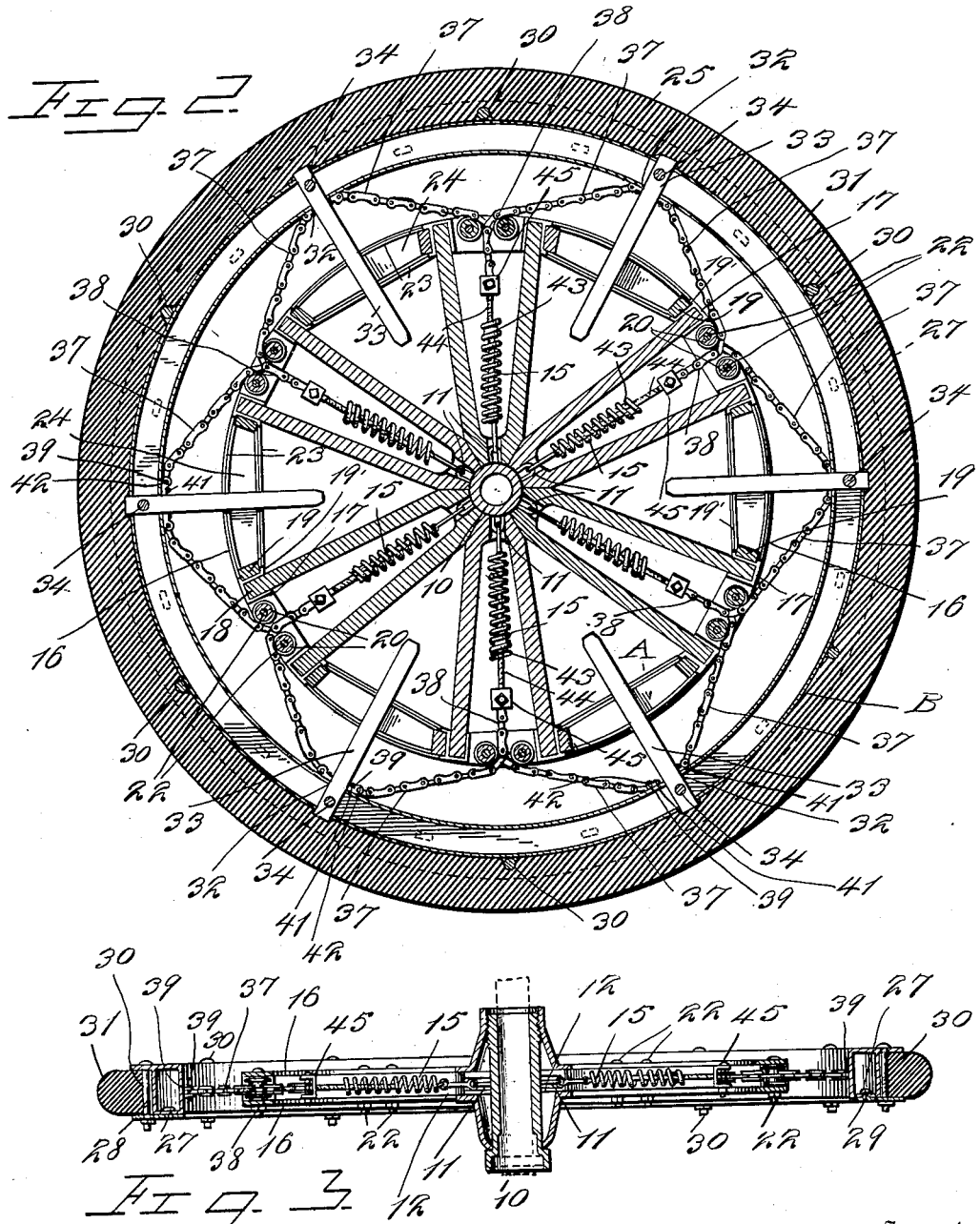

W. T. MURRAY.
SPRING WHEEL.
APPLICATION FILED JUNE 6, 1911.

1,018,259.

Patented Feb. 20, 1912.

3 SHEETS—SHEET 3.

WITNESSES:
O. M. Simpson
J. B. Fowler

INVENTOR
William T. Murray
BY H. L. Woodward
Attorney

UNITED STATES PATENT OFFICE.

WILLIAM T. MURRAY, OF BALDWIN, KANSAS.

SPRING-WHEEL.

1,018,259.  Specification of Letters Patent.  Patented Feb. 20, 1912.

Application filed June 6, 1911. Serial No. 631,624.

*To all whom it may concern:*

Be it known that I, WILLIAM T. MURRAY, a citizen of the United States, residing at Baldwin, in the county of Douglas and State of Kansas, have invented new and useful Improvements in Spring-Wheels, of which the following is a specification.

This invention relates to resilient wheel construction, and has for its object to provide an improved construction which will possess great lateral strength, durability, and efficiency; and which will be quiet in operation and inexpensive to manufacture.

An important object is to so arrange and connect a plurality of springs between inner and outer relatively movable wheel sections that the tension of all will at all times be exerted in holding the parts yieldably in spaced relation.

A further important object is to provide an efficient spoke construction, in a device of this class permitting the mounting of spring members therein, without unduly weakening them.

Another important object is to attain an even resilient support of the inner member of the wheel in all positions during rotation.

Another object is to provide a wheel of this type adapted to use as a traction wheel for communication of an even tractive effect throughout its movement.

An additional object is to provide a novel and efficient form of connection between the relatively movable parts of the wheel.

Figure 1:
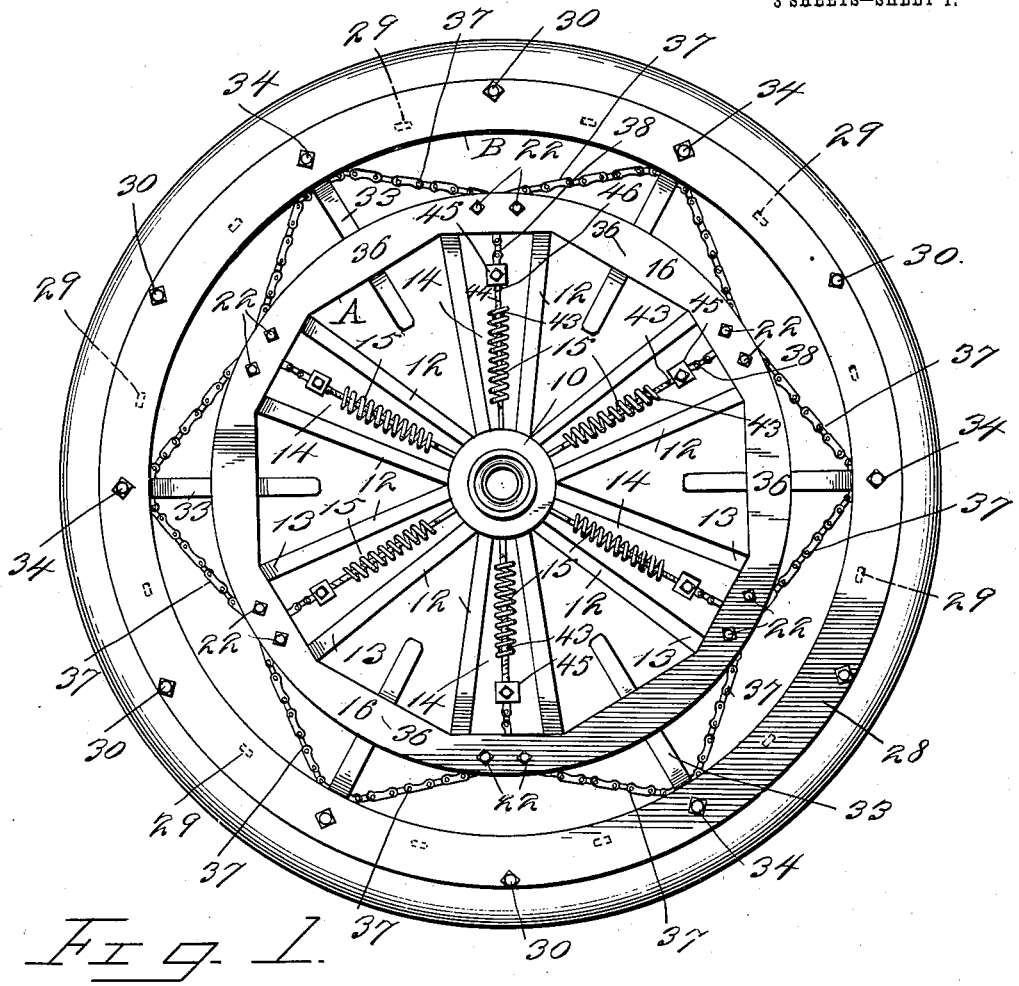
Figure 4:
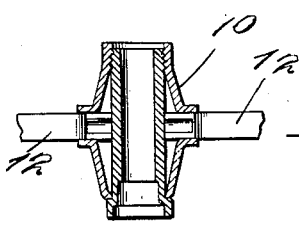
Figure 5:
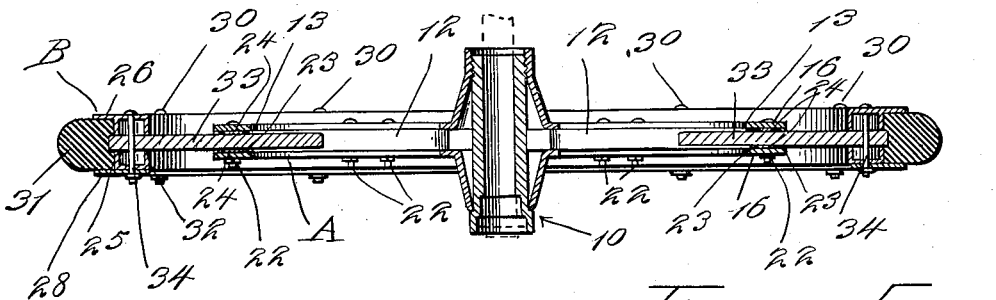
Figure 6:
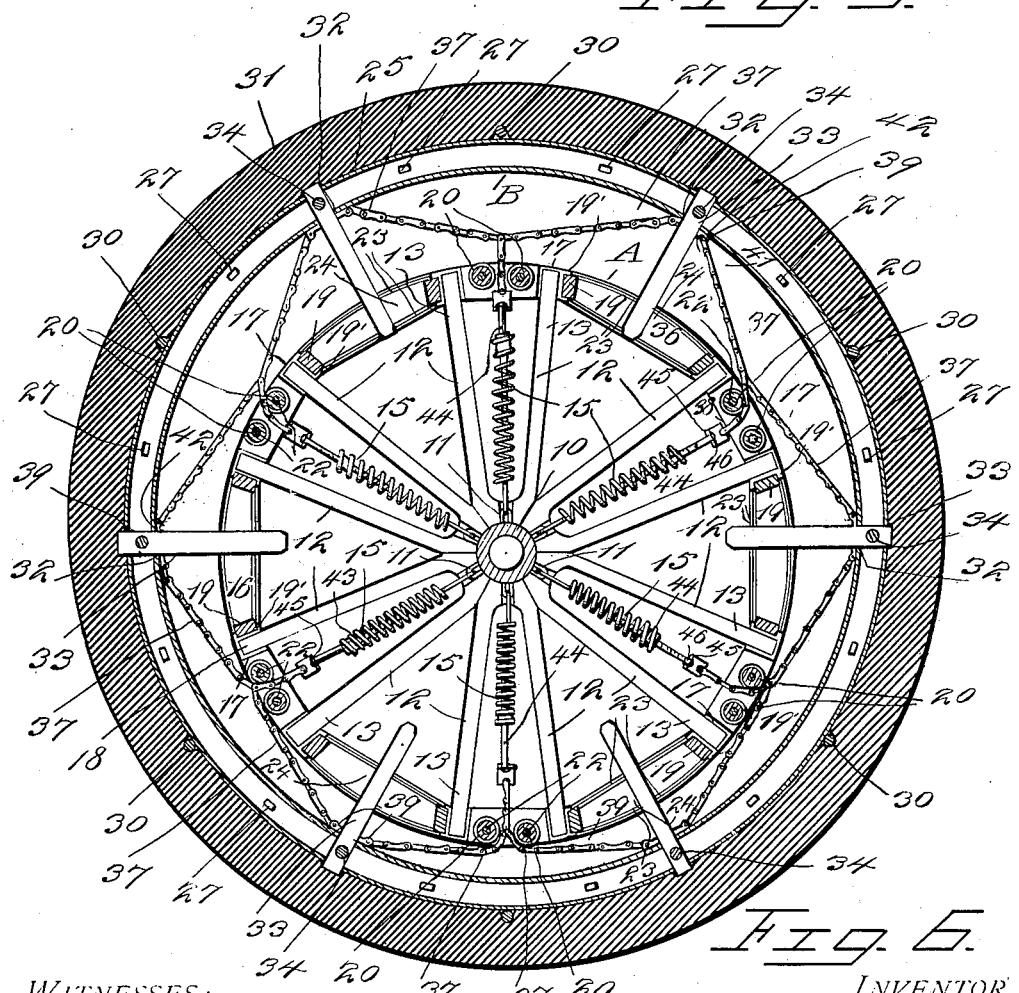

Other objects and advantages will be apparent from the following description, and from the drawings, in which, Figure 1 is a side view of the wheel, Fig. 2 is a sectional view thereof in its major plane, Fig. 3 is a vertical section centrally of Fig. 1, Fig. 4 is a fragmentary sectional view of the hub, Fig. 5 is a horizontal section centrally of Fig. 1, Fig. 6 is a view similar to Fig. 2, showing the wheel under load.

Referring to the drawings, there is shown a wheel comprising the central wheel portion A and the rim member B of larger diameter and concentrically spaced therefrom. The wheel portion comprises the hub 10, of ordinary construction, spring anchors 11 being carried thereby at suitable intervals. The spokes 12 are engaged with the hub in approximately the customary manner, their head portions 13 being slightly offset therefrom, so that the spokes may extend tangentially in a slight degree, adjacent pairs being almost in parallel, and a wide space 14 provided therebetween for the reception and proper operation of the helical springs 15 engaged with the anchors and extending radially between each pair of spokes. The extremities of the spokes carry at each side a rim 16 provided with suitable mortise forming projections 17 on their inner sides receiving the tenons 18 of the spokes therein and having cup like portions 19' outwardly of the spokes and between these rims to receive a suitable buffer 19 against which guide spokes of the outer rim may strike, as will be described. Immediately over, or inward of the spokes between the rims, suitable rollers 20 are mounted, having suitable chain-guard flanges at each end, the faces of the rollers being provided with suitable material to lessen the noise which might be made by a chain moving thereover. The entire roller may be made of a suitable composition other than metal, if desired. The roller-axles may be made to serve as a tie means holding the rims 16 in proper relation, as indicated at 22. Intermediately of the buffers 19, the inner sides of the rims are provided with slight ribs 23 adjacent their inner and outer edges, between which are set leather facings 24 for a purpose to be described.

The rim member 8 comprises a body member formed in any suitable manner with a tire seat portion 25 suitable for the reception of a rubber or like tire slidable thereover from one side, the opposite side being provided with a fixed retaining flange 26. The side of the rim B opposite the flange 26 is provided with a series of notches or small sockets 27, and a detachable tire-retaining ring 28 is provided, having suitable lugs 29 on its inner side for engagement in the sockets to hold it against rotation. This ring is held in place by suitable bolts 30 extending across the seat portion and engaging in the flange 26. A tire 31 suitably notched to engage snugly over the bolts is engaged upon the seat 25, and it will thus be seen that the bolts perform the valuable function of holding the tire against "creeping" upon the rim. In staggered relation to the pairs of spokes in the wheel portion, passages 32 are formed through the rim, receiving guide spokes 33 slidably for detachment at times, and as indicated in dotted lines, these spokes may project slightly outward of the seat portion 25 whereby to make the retention of the tire more secure by being fitted into suitable sockets in its inner surface. The spokes 33 are held securely in place by means of bolts 34. The inner end portions of the spokes 33 are disposed snugly between the rims 16 and against the facings 24 thereon to prevent lateral movement of the rim B with respect to the wheel A. Normally they will have a limited movement centrally of the spaces between the pairs of spokes, and it will be observed that in order to compensate for the greater wear to which the central portions will be subjected, they are broadened, as at 36.

Anchored at each side of the guide spokes, on the inner face of the rim B there are chains 37 leading to the spaces between the rollers 20, where they are connected to single chains 38 connected to the outer ends of the adjacent springs 15, which are secured to the hub as before described. The means for anchoring the chains to the rim may comprise the flat block member 39, suitably perforated for the engagement of bolts 41 therethrough and with the rim, the block being provided with the eye portion 42 in which is engaged the pivot pin for the first link of the chain 37. This chain is preferably of the block and link type similar to that used on bicycles, though a more suitable equivalent may be used if desired. The method of securing the chains 38 to the springs 15 consists in securing a nut member 43 adjacent the outer end of each spring and revolubly threading the headed bolt 44 therein, the head of the bolt being swiveled in the U-shaped yoke 45, within which the innermost link of the chain 38 is pivoted. The bolt is provided with a square portion 46 immediately adjacent the yoke, so that it may be readily rotated to adjust the tension upon the spring.

It will be appreciated from the foregoing that when weight is supported by the central wheel portion, it will tend to move downward whereby all of the chains 37 whose anchorage points on the rim B are higher than the point of their entrance between the rollers 20 will draw upon the chains 38 against the actions of the respective springs 15 and support the wheel resiliently. The effect of the springs will be evenly distributed as the wheel rotates, and the variance of tension in the springs as their positions change will not produce uneven tractive efficiency in the device.

What is claimed is:

1. A device of the class described comprising an interior wheel member and a rim member spaced from the periphery of the wheel, a plurality of guide spokes carried by the rim, retaining portions carried by the wheel receiving the spokes for longitudinal and lateral sliding movement, resilient devices carried by the wheel, and divergent flexible connections between the resilient devices and the rim.

2. A device of the class described comprising an interior wheel member comprising a hub, a plurality of spokes carried thereby, in pairs having wide spaces therebetween, rim members carried on opposite sides of the spokes at their extremities, spaced pairs of rollers adjacent the extremities of the spokes, a rim member spaced concentrically outward of the wheel, spring members anchored to the hub between the spokes of said pairs, flexible members connected to the springs extending outwardly between the rollers and thence divergently to and being secured upon the rim, and guide spokes carried by the rim and engaged slidably between the first named rims intermediately of the pairs of spokes, as described.

3. A device of the class described comprising a wheel member including a hub, pairs of closely spaced spokes thereon having a spring receiving space between pairs, the pairs being widely spaced from each other at their outer ends, a rim concentrically spaced outwardly of the spokes, guide spokes carried thereby projecting inwardly intermediately of the pairs of spokes first named, opposed rim members having spoke receiving portions carried at the extremities of and on opposite sides of the spokes in spaced relation and receiving the guide spokes slidably therebetween for play between the pairs of spokes, buffer means at opposite sides of the pairs of spokes to limit the movement of the guide spokes, anti-friction devices carried between the said opposed rim members at the ends of the pairs of spokes, springs anchored to the hub between the pairs of spokes, flexible members connected thereto and leading outward between and extending divergently from the anti-friction devices to the said traction rim.

4. In a device of the class described, an outer rim member and stub spokes carried thereby, a wheel member spaced concentrically therewithin including a hub, spokes carried thereby, spring members carried by the hub, and opposed rims engaged with and on opposite sides of the spokes; spring members anchored to the hub, internally threaded members carried thereby, a bolt threaded in each and having an outer head portion and adapted to be engaged by an implement for rotation, a yoke swiveled on the head, and flexible members connected to the yoke and extending outwardly and divergently to and being secured upon the said outer rim.

5. A device of the class described comprising an outer rim portion adapted to receive a cushion tire portion, inwardly projecting stub spokes carried thereby, a wheel member spaced concentrically within the rim, including a hub, spokes carried thereby, resilient devices on the wheel, and divergent flexible connections between the resilient devices and the rim, opposed rims having spoke receiving portions carried thereby and having broadened portions between certain of the spokes receiving the stub spokes slidably therebetween, retaining ribs formed on their opposed faces at their broadened portions, cushion material secured between the ribs in slidable engagement with the stub spokes and buffer means at each end of the broadened portions to limit the movement of the stub spokes.

In testimony whereof I have hereunto set my hand in presence of two subscribing witnesses.

WILLIAM T. MURRAY.

Witnesses:
J. B. Ross,
W. G. Hazen.